United States Patent
Hodge

(10) Patent No.: US 10,891,446 B2
(45) Date of Patent: *Jan. 12, 2021

(54) BIDIRECTIONAL CALL TRANSLATION IN CONTROLLED ENVIRONMENT

(71) Applicant: **Global Tel*Link Corporation**, Reston, VA (US)

(72) Inventor: Stephen L. Hodge, Aubry, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/148,737

(22) Filed: Oct. 1, 2018

(65) Prior Publication Data

US 2019/0171715 A1 Jun. 6, 2019

Related U.S. Application Data

(63) Continuation of application No. 15/648,071, filed on Jul. 12, 2017, now Pat. No. 10,089,305.

(51) Int. Cl.
*G06F 40/58* (2020.01)
*H04M 3/42* (2006.01)

(52) U.S. Cl.
CPC .............. *G06F 40/58* (2020.01); *H04M 3/42* (2013.01); *H04M 2203/2061* (2013.01)

(58) Field of Classification Search
CPC .......... G06F 40/44; G06F 40/45; G06F 40/47; G06F 40/58; G06F 40/211; G06F 40/253
See application file for complete search history.

(56) References Cited

U.S. PATENT DOCUMENTS

| | | | |
|---|---|---|---|
| 6,449,474 B1 | 9/2002 | Mukherjee et al. | |
| 8,027,438 B2 | 9/2011 | Daigle et al. | |
| 10,089,305 B1 | 10/2018 | Hodge | |
| 2006/0009195 A1 | 1/2006 | Itoh | |
| 2009/0006076 A1 | 1/2009 | Jindal | |
| 2009/0048820 A1* | 2/2009 | Buccella | G06F 17/289 704/2 |
| 2009/0125295 A1 | 5/2009 | Drewes | |
| 2010/0159891 A1 | 6/2010 | Sigmund et al. | |
| 2010/0280828 A1* | 11/2010 | Fein | G10L 15/1822 704/246 |
| 2011/0055309 A1 | 3/2011 | Gibor et al. | |
| 2012/0069131 A1 | 3/2012 | Abelow | |
| 2013/0144603 A1* | 6/2013 | Lord | H04M 3/56 704/9 |
| 2013/0144619 A1 | 6/2013 | Lord et al. | |

(Continued)

*Primary Examiner* — Lamont M Spooner
(74) *Attorney, Agent, or Firm* — Sterne Kessler Goldstein & Fox P.L.L.C.

(57) ABSTRACT

A call translation system and a method for operating the management system in a controlled environment is disclosed. The call translation system includes a calling device and a call translation server. The calling device receives authorization from the call translation server to conduct call sessions within the controlled environment. The calling device further receives a call session application from the call translation server that enables the calling device to initiate and establish call sessions through the call translation server. The call session application allows a user of the calling device to select outside parties to add to the call session.

20 Claims, 7 Drawing Sheets

(56) References Cited

U.S. PATENT DOCUMENTS

| | | |
|---|---|---|
| 2014/0244235 A1* | 8/2014 | Michaelis .......... H04L 12/1827 704/2 |
| 2015/0347399 A1 | 12/2015 | Aue et al. |
| 2015/0350451 A1 | 12/2015 | Aue et al. |
| 2016/0170970 A1 | 6/2016 | Lindblom et al. |
| 2017/0085721 A1 | 3/2017 | Keiser |
| 2017/0264739 A1 | 9/2017 | Smith |

* cited by examiner

BIDIRECTIONAL CALL TRANSLATION IN CONTROLLED ENVIRONMENT

CROSS REFERENCE TO RELATED APPLICATION

This application is a divisional of U.S. Nonprovisional patent application Ser. No. 15/648,071, filed Jul. 12, 2017, titled "Bidirectional Call Translation in Controlled Environment," the contents of which are hereby incorporated herein by reference in its entirety.

BACKGROUND

Field

This disclosure relates to real-time bidirectional voice-to-voice translation of communications where one party in the communication is a resident of a controlled environment.

Background

Residents within a controlled environment are typically allowed to engage in real-time communications with a non-resident outside of the controlled environment. However, in an increasingly diversifying society, residents with the controlled environments as well as non-residents with whom the residents communicate are likely to speak a language different from English as their first language or are able to speak in different languages in addition to English. Prior art communication systems face issues with this proliferation in languages because they are not able to perform any language translation of real-time communications, especially in situations where the resident and non-resident speak different languages from each other and from the native language of any monitoring systems associated with the controlled environment.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
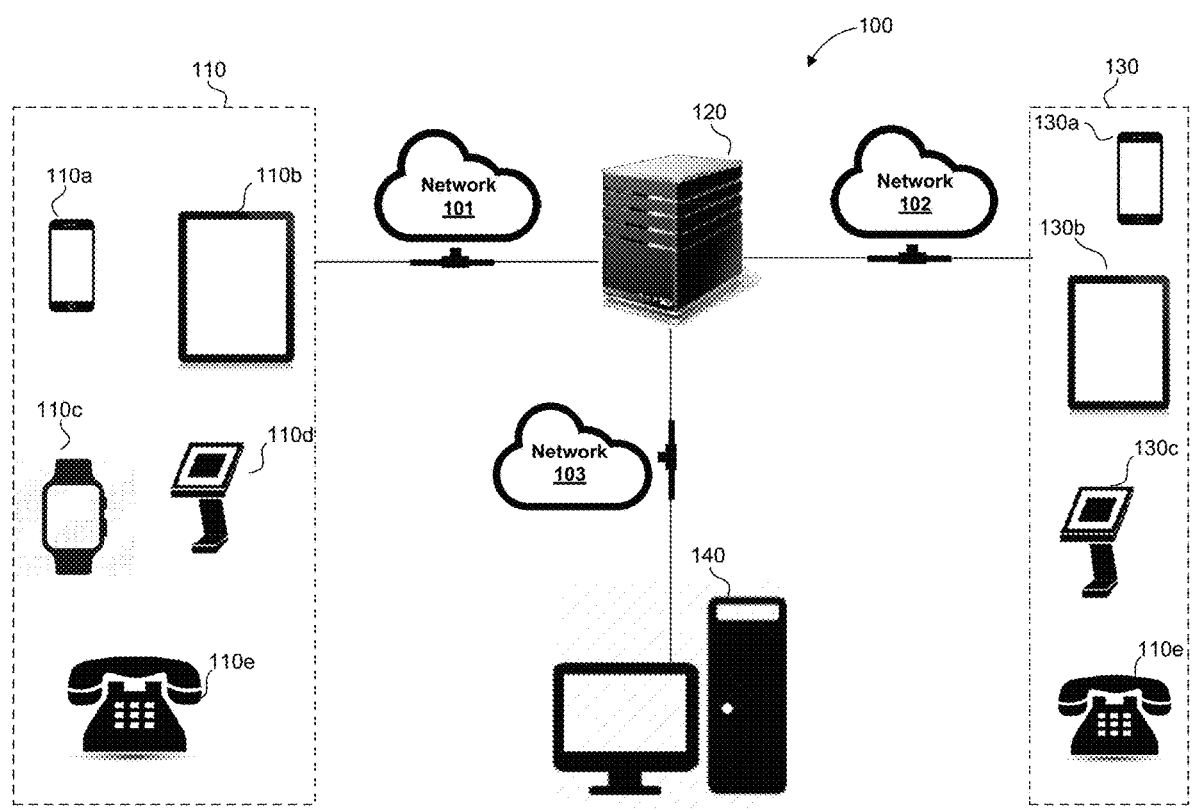
FIG. 1 illustrates a block diagram of an exemplary call translation system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Accordingly, there is a need for controlled environments to allow its inmates to use the personal mobile devices for activities that can be typically performed through issued mobile devices while the inmates are incarcerated within the controlled environments. Allowing use of personal mobile devices would allow a controlled environment save money by having to purchase less mobile devices for use by its inmates. Because the inmates are using their own personal mobile devices, inmates will also take better care of their own devices. The personal mobile device can be retained by the inmate after his incarceration and used to make phone calls through the inmate's cellular provider provided that the inmate consents to the policies and requirements of the jurisdiction including signing a consent form waiving their fourth amendment rights granting the controlled environment authority to monitor and record all communications made by the inmate through his mobile device while incarcerated in the controlled environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Exemplary Call Translation System

FIG. 1 illustrates a functional diagram of an exemplary call translation system 100, according to embodiments of the present disclosure. Call translation system 100 can be implemented in a controlled environment, such as a correctional facility, jails, or prisons, that houses residents. For example, in a correctional facility, jail, or prison, a resident can be considered an inmate or a detainee. Controlled environments may refer to other types of facilities in which the actions and/or movement of its residents are monitored and/or managed by administrative personnel. In the embodiments discussed below, for ease of explanation, a controlled environment may be referred to as a correctional facility and residents may be referred to as inmates. However, a controlled environment can be implemented as any facility in which communications and/or the movements of its residents are monitored or controlled such as a hospital or nursing home.

All or portions of call translation system 100 can be implemented in a controlled environment. In some embodiments, call translation system 100 includes calling devices 110, call translation server 120, outside calling devices 130, and monitoring system 140. In some embodiments, calling devices 110 are limited to use within the controlled environment. In some embodiments, at least one of call translation server 120 and monitoring system 140 are implemented within the controlled environment with calling devices 110.

Calling devices 110 are connected to call translation server 120 through network 101. Outside calling devices 130 are connected to call translation server 120 through network 102. Call translation server 120 acts as an intermediary through network 101 and network 102 between calling devices 110 and outside calling devices 130. Call translation server 120 is connected to monitoring system 140 through network 103. In another embodiment, monitoring system 140 is integrated into call translation server 120. Call sessions between calling devices 110 and outside calling devices 130 include voice-only call sessions (e.g., telephone calls) and video call sessions.

Networks 101, 102, and 103 may include any or all of a Local-Area Network (LAN), a Wide-Area Network (WAN), or the Internet, depending on the location of call translation server 120 in relation to calling devices 110 and monitoring system 140. For example, network 101 is implemented as a LAN when call translation server 120 is co-located with calling devices 110. In another example, network 101 is implemented as a WAN or the Internet when call translation server 120 is located remotely from calling devices 110. In some embodiments, call translation server 120 is cloud-based and includes one or more cloud-based servers. In some embodiments, call translation server 120 is a server within a data center that supports the wireless devices within the controlled environment. Similarly, network 103 can be implemented as either a LAN or WAN depending on the positional relationship between call translation server 120 and monitoring system 140. Because outside calling devices 130 are typically outside of the controlled environment, network 102 can be implemented as a WAN or the Internet because call translation server 120 will be located remotely from outside calling devices 130.

Call translation system 100 provides management of calling devices 110, such as a smartphone 110a, a tablet 110b, a wearable device 110c, a call kiosk 110d, and a plain old telephone system (POTS) telephone 110e. In some embodiments, the controlled facility distributes and/or provides calling devices 110 to its inmates. Calling devices 110 are devices operated by inmates within a controlled environment and can be remotely managed and updated by call translation server 120. As they are generally under the supervision of the controlled environment, calling devices 110 include administrative software that enable administrators to remotely access and configure calling devices 110. In order to implement the call translation functionality described herein, calling devices 110 further include specialized software that enable calling devices 110 to establish call session preferences (e.g., language preferences for calls, contact preferences). In some embodiments, inmates of the controlled environment create and modify user profiles that include the preferences for the inmates with respect to call sessions and contacts associated with the inmate (e.g., in the inmate's personal allowed number (PAN) list). The specialized software also allow inmates to initiate and conduct call sessions through call translation server 120. Established calls are subject to any conditions and/or preferences within the user profile by restrictions and/or conditions provided by call translation server 120 and/or monitoring system 140, which will be discussed further herein.

In some embodiments, calling devices 110 can connect to network 101 through wireless connections, such as Bluetooth™ or IEEE 802.11 (commonly known as Wi-Fi). Calling devices 110 can connect to network 101 through one or more access points (not shown) that are installed in controlled environment which provide network access between calling devices 110 and call translation server 120. The access point can be implemented as any device that provides network access such as, but not limited to, a router, a modem, smartphone, a tablet, or a laptop device.

In some embodiments, call translation server 120 acts as an intermediary in a call session between calling devices 110 and outside calling devices 130. Call translation server 120 manages call sessions within call translation system 100, receives requests for call sessions and establishes call sessions. Call translation server 120 further manages user profiles established for each inmate of the controlled environment and enforces any restrictions or conditions associated with the inmates and/or call sessions. In some embodiments, such as when monitoring system 140 is incorporated into it, call translation server 120 also records and monitors call sessions. In some embodiments, call translation server 120 records call sessions and provides the recorded call sessions to monitoring system 140 for further monitoring.

In some embodiments, call translation functionality of call translation system 100 is centrally implemented in call translation server 120. For example, call translation server 120 receives voice data during a call session between calling devices 110, such as smartphone 110a, and outside calling devices 130, such as outside smartphone 130a. Voice data is generated by a mobile device that receives words in a specific language spoken by a user of the mobile device and converts the received information into voice data that is transmitted during the call session to another mobile device. Continuing the example above, smartphone 110a receives words spoken by an inmate of a controlled environment and transmits voice data to call translation server 120. Call translation server 120 translates the voice data from the language spoken by the inmate into voice data of another language spoken by a user of outside smartphone 130a. Call translation server 120 can perform real-time or near-real time language translation. Real-time language translation refers to performing the translation of voice data automatically as the voice data is received. Conversely, near-real-time language translation refers to performing the translation of voice data upon receipt of a translating signal that indicates the voice data should be translated. In other words, real-time language translation attempts to translate voice data automatically upon receiving the voice data while near-real-time language translation waits for the receipt of a translating signal that is not the voice data before performing the translation of voice data. In near-real-time language translation, voice data is collected and held until receipt of the translating signal.

In some embodiments, call translation server 120 performs this language translation based on preferences established in a user profile associated with the inmate. In some embodiments, language translation is based on at least one of the user profile, an outside caller profile, or a monitoring profile associated with a monitoring system that is monitoring the call session. In some embodiments, the user profile includes language preferences of both the inmate and the user of outside smartphone 130a. Outside caller profile includes language and calling preferences of the outside caller. Monitoring profile includes language and monitoring preferences of the monitoring system.

In some embodiments, call translation functionality of call translation system 100 is distributed between call translation server 120 and at least one of calling devices 110 and outside calling devices 130. In such embodiments, call translation server 120 installs a call translation application in calling devices 110 and/or outside calling devices 130. Users of calling devices 110 and/or outside calling devices 130 open the call translation application in order to initiate call sessions through call translation server 120. In some embodiments, call translation application includes a telephone dialer, a voice processing function, and a translation signal generator, as will be discussed in further detail below with regard to FIG. 3. The voice processing function assists the call translation performed by call translation server 120 by pre-processing voice data received by calling devices 110 and outside calling devices 130. In some embodiments, pre-processing voice data includes converting the voice data into a format that can be more easily translated by call translation server 120, performing an preliminary call translation of a portion of voice data, and removing background noise from the voice data. Examples of conversion into a format include but are not limited to converting the file type of the voice data into a file type that can be translated by call translation server 120 or a file type that reduces the file size of the voice data for easier transmission.

In some embodiments, outside calling devices 130 are devices that are operated by call participants, such as non-residents, that are outside of the controlled environment. Outside calling devices 130 include at least one of outside smartphone 130a, outside tablet 130b, outside call kiosk 130c, and POTS telephone 110e. In an embodiment, outside calling devices 130 may be located within the controlled environment, such as in a designated area or room of the controlled environment. Accordingly, devices can be considered outside of the controlled environment when they are operated by participants who are not incarcerated or otherwise detained within the controlled environment and/or not directly managed or controlled by the controlled environment. In another embodiment, outside calling devices 130 may be located outside of the controlled environment such as in the outsider's home. Outside calling devices 130 connect to call translation server 120 via network 102, which may include any or all of a WAN, the Internet, and/or a Public Switched Telephone Network (PSTN). The WAN may facilitate communications with other nearby prisons, such as those within the same county, state, etc.

In some embodiments, monitoring system 140 monitors call sessions between calling devices 110 and outside calling devices 130. Monitoring system 140 can perform audio and/or video analysis on call sessions to ensure that participants in the call session are behaving consistent with guidelines established by the controlled environment. For example, monitoring system 140 can detect within call sessions whether participants are discussing illegal activities or are having lewd conversations.

Whether incorporated into call translation server 120 or implemented as a standalone system, monitoring system 140 can monitor call sessions automatically (e.g., on every call session) and/or manually (e.g., initiated by an administrator of the controlled environment or by other authorized personnel). Additionally, monitoring system 140 can monitor call sessions in real-time (e.g., as call sessions are on-going) and/or on a delayed basis (e.g., on recorded call sessions). In some embodiments, monitoring system 140 can be located remotely from call translation server 120 and call sessions can be stored on call translation server 120 which can then later provide the recorded call sessions to monitoring system 140 for analysis. Call translation server 120 can also stream on-going call sessions to monitoring system 140 over network 103 so that monitoring system 140 can remotely perform real-time analysis on call sessions. Monitoring system 140 can further be configured to communicate with call translation server 120 to indicate approval of starting, sending, or receiving a call session.

As previously noted, in some embodiments, monitoring system 140 monitors in real-time on-going call sessions. Monitoring system 140 receives voice and translated voice data from call translation server 120. In some embodiments, voice and translated voice data are included in user profiles and are stored or associated with the user profiles at the completion of every call session involving the inmate and in which call translation took place. In some embodiments, call translation server 120 stores outsider profiles associated with non-residents outside of the controlled environment have outsider profiles; the outsider profiles include voice and translated voice data associated with the non-resident.

In some embodiments, monitoring system 140 utilizes the stored voice and translated voice data to improve the efficiency and accuracy of the call translation functions of call translation server 120. Monitoring system 140 analyzes the voice and translated voice data includes determining speech metrics associated with any parties (e.g., the inmate, the called party) associated with the voice and translated voice data. Examples of speech metrics include but are not limited to:

Cadence: the speed at which a user speaks;
Word/Phrase Frequency: tracking the user's usage of words or phrases; and
Intonation: the pitch (i.e., rise and fall) of the user's voice.

Speech metrics of a user are stored in an associated profile, such as a speech profile that is associated with a particular user, and increase the accuracy and speed of call translation function for the particular user. In some embodiments, the speech profile may be combined with information in the profile associated with a particular user. For example, in some embodiments, call translation server 120 stores a list of a user's most used words and phrases including their translations. In this manner, upon detection of those words and phrases within a subsequent call session, call translation server 120 can retrieve the already translated words and phrase instead of performing a new translation. Similarly, analysis of a user's cadence can train call translation server 120 to understand how quickly or slowly a user speaks which, in turn, can improve call translation server 120's understanding of when a user has stopped speaking and when to start the translation process. Monitoring system 140 can analyze any number of call sessions involving an inmate to learn the inmate's particular speech metrics. In this manner, the speech metrics train the call translation function of the present disclosure to improve its translation efficiency and accuracy over time.

Moreover, in some embodiments, monitoring system 140 also detects and/or analyzes characteristics of call sessions which include but are not limited to the voice data and translated voice data of a call session. Monitoring system 140 detects triggers within the voice data and translated voice data. Detected prohibited or alert words in either the voice data or translated voice data can trigger monitoring system 140 to perform a predetermined action such as terminating the call session, provide a warning to the participants of the call session, and/or provide an alert of the detected prohibited action to the appropriate administrators.

Exemplary Call Translation Server

Figure 2:
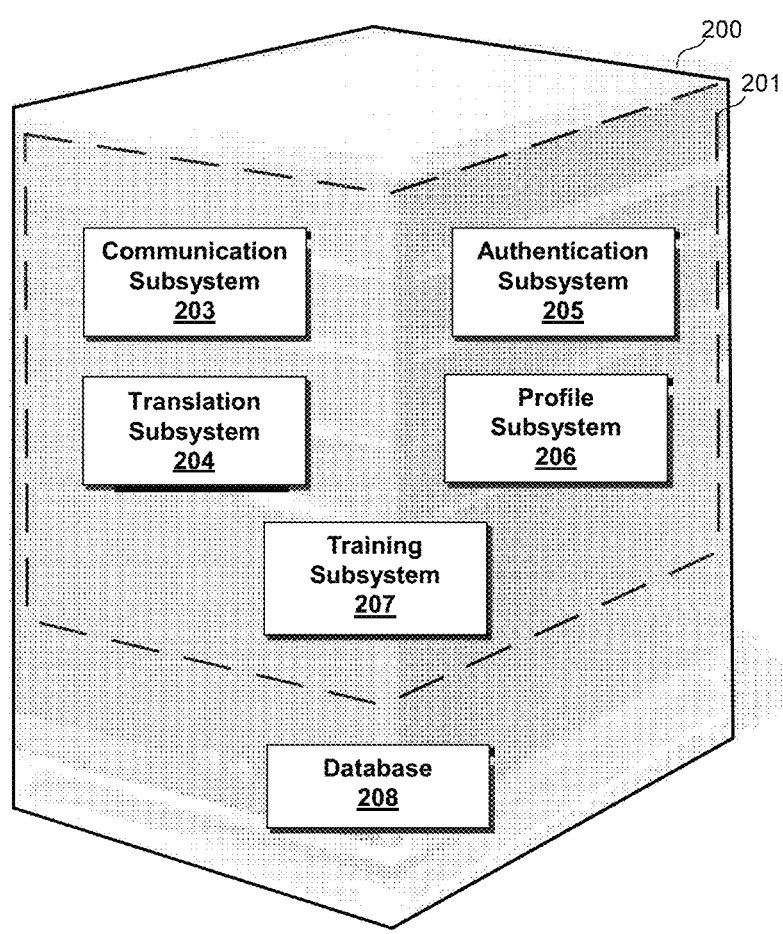
FIG. 2 illustrates an exemplary call translation server for use in the exemplary call translation system of FIG. 1, according to embodiments of the present disclosure.

FIG. 2 illustrates a block diagram of call translation server 200, according to some embodiments of the present disclosure. In some embodiments, call translation server 200 represents an exemplary embodiment of call translation server 120 of FIG. 1. Call translation server 200 includes but is not limited to processing subsystem 201 and database 208.

Processing subsystem 201 includes one or more processors, computers, or servers identified as subsystems and can be constructed as individual physical hardware devices, or as virtual devices, such as a virtual server. The number of processing subsystems can be scaled to match the number of simultaneous user connections desired to be supported by a call translation system such as call translation system 100 of FIG. 1. Processing subsystem 210 includes but is not limited to communication subsystem 203, translation subsystem 204, authentication subsystem 205, profile subsystem 206, and training subsystem 207.

In some embodiments, communication subsystem 203 controls the routing of communications including voice data and/or translated voice data associated with call sessions between calling devices 110, outside calling devices 130, and monitoring system 140. Communication subsystem 203 also routes data from call sessions including voice data to the appropriate subsystems within call translation server 200 for processing of the data. For example, communication subsystem 203 routes voice data to translation subsystem 204 for translation of the voice data, to authentication subsystem 205 for performing authentication of the voice data and for the call session, and to profile subsystem 206 for storage of the voice data and/or translated voice data of a call session with the profile of the parties (e.g., inmate, outside party) associated with the call session.

Communication subsystem 203 further performs signal switching to electrically connect calling devices 110 within the controlled environment with outside calling devices 130. Communication subsystem 203 further communicates with monitoring system 140 and transmits ongoing or stored call sessions to monitoring system 140 in the form of voice data and/or translated voice data. Communication subsystem 203 furthers record call sessions including metadata associated with the call sessions such as time of sessions and participants involved in the call sessions. Communication subsystem 203 can automatically or by request transmit recorded call sessions to monitoring system 140 for analysis. Communication subsystem 203 coordinates with training subsystem 207 to generate speech metrics based on voice data and/or translated voice data.

In some embodiments, translation subsystem 204 performs call translation functions on voice data transmitted during call sessions within call translation system 100. Translation subsystem 204 performs real-time, near-real-time, and/or delayed translation functions of voice data from call sessions between calling devices 110 and outside calling devices 130. As discussed above, real-time translation refers to performing immediate translation after each word spoken by a party during an ongoing call session; near-real-time translation refers to the translation subsystem 204 performing translation after receiving a translating signal during an ongoing call session from either a device involved or by call translation server 200. In near-real-time translation, translation subsystem 204 monitors a call session and collects voice data until receipt of any translation signals upon which translation subsystem 204 begins translation of the collected voice data that preceded the received translation signal. In some embodiments, the translating signal may be generated based on any of the following:

Receiving a specific touch-tone signal (e.g., from a POTS telephone). For example, a party to a calling session using a POTS telephone may press the "#" or "*" button after speaking which is received at call translation server 200 as a translation signal. In other words, call translation server 200 interprets the button pressed

- by POTS telephone as a signal to translate any voice data received preceding the button press.
- Receiving a specific signal from a calling device (e.g., upon pressing a specific software button displayed on a graphical user interface (GUI)). For example, a party to a calling session using a smart phone may press the "#" or "*" button as described above with respect to a POTS phone, or a dedicated software button provided by a GUI of a call translation application installed on the smart phone.
- A predetermined period of time in which no voice data is detected by call translation server 200 (and by calling devices 110 in embodiments where call translation functions are distributed). In some embodiments, call translation server 200 interprets the predetermined period of time as an indication that the party has stopped speaking and that translation of any voice data received prior to the predetermined period of time is to be initiated. In some embodiments, the predetermined period of time may be dynamically adjusted based on the speech metrics of a user. For example, a default predetermined period of time may be set to 200 milliseconds but this value may be adjusted for speakers who speak more quickly (e.g., the predetermined period of time could be set lower) or for speakers who speak more slowly (e.g., the predetermined period of time could be set higher).

Delayed translation functions refers to performing translation at the completion of each call session.

In some embodiments, translation subsystem 204 utilizes multi-language dictionaries that are stored in database 208 in order to perform the language translation. In some embodiments, translation subsystem 204 utilizes a translation application either located within call translation server 200 or on an external device/network for performing the language translation.

In some embodiments, translation subsystem 204 works in conjunction with profile subsystem 206 to update user profiles based on any translated voice data associated with the inmate. Translation subsystem 204 also works in conjunction with training subsystem 207 to generate speech metrics and updating speech profiles based on the translated voice data.

In some embodiments, authentication subsystem 205 performs authentication functions for establishing call sessions within call translation system 100. Authentication subsystem 205 receives authentication information from parties of the call session (e.g., inmates, outside parties). Authentication information can include but is not limited to at least one of a username and password data, challenge questions, challenge answers, biometric data, device data such as make and model of a communication device, and/or location data. Biometric data includes one or more of a finger print, a hand print, a voice sample, an iris or retinal sample, a facial image of the user (2D or 3D), a gait identification, a hand geometry, a signature identification, an infrared camera identification, or any other biometric as deemed appropriate. Authentication subsystem 205 has biometric capabilities and analyzes voice data to determine the identities of parties in the voice data. Authentication subsystem 205 then is able to determine whether the identified parties are allowed to participate in the call session or whether an unauthorized hand-off has occurred during the call session. Authentication subsystem 205 further assists in establishing a secure communication between calling devices 110 and call translation server 200.

Authentication subsystem 205 also generates notifications and alerts to authorized personnel of the controlled environment based on audio analysis performed by other subsystems such as translation subsystem 204. For example, authentication subsystem 205 triggers a notification when translation subsystem 204 detects a certain phrase or word in the voice data. The notification can be sent to an administrator who can confirm or deny the results of the analysis. In this manner, language translation of call sessions includes voice analysis as well as content analysis of the conversations taking place during the call session. Voice analysis performed by authentication subsystem 205 involves comparing voices detected during the call session with voices expected to be heard on the call based on, for example, an identifier of the participant that was used to establish the call session. Content analysis includes detecting and transcribing the words spoken by all participants during the call session and performing any predetermined actions as determined by associated administrative rules.

In some embodiments, profile subsystem 206 stores profiles associated with all users within call translation system 100. Users include inmates within the controlled environment, outside parties, and administrative personnel who use call translation server 200 or monitoring system 140 to monitor call sessions. Profile subsystem 206 receives and implements preferences from inmates regarding call translation functionality including but not limited to managing language preferences in the profiles. The profiles specify the language preferences for the user associated with the profile. For example, for an inmate who can speak English and Spanish, the inmate's profile will include a first and second language identifier indicating English and Spanish, respectively. In some embodiments, the inmate is allowed to make this change on calling device 110 without requiring approval from administrative personnel of the controlled environment. User profiles also include PAN lists with contact information for outside parties with whom inmates are allowed to communicate. In some embodiments, each contact in an inmate's PAN list is associated with a language identifier associated with each language that is spoken by the contact. In some embodiments, call translation system 100 generates separate profiles for outside parties that take part in a call session. Profiles for outside parties include the language identifier or identifiers associated with the outside party as well as any stored voice and translated voice data of call sessions in which the outside party has participated. In some embodiments, call translation system 100 also generates separate profiles for administrative personnel responsible for monitoring call sessions at either call translation server 200 or at monitoring system 140. For example, a call session may involve an inmate having a language identifier that indicates the inmate speaks English and Spanish and an outside party having a language identifier that also indicates the outside party only speaks Spanish. In a likely scenario, the inmate and the outside party would converse in Spanish during the call session. A profile for administrative personnel tasked with monitoring the call session in real-time may indicate that the administrative personnel only speaks English. Accordingly, call translation server 200 would automatically translate the voice data of the call session from Spanish into English so that the administrative personnel can monitor the call. However, because both the outside party and the inmate are fluent in Spanish, the translated voice data does not need to be transmitted between their devices. In some embodiments, administrative personnel may manually initiate the translation process irrespective of the language identifiers of the parties involved in the call.

In some embodiments, profile subsystem 206 works in conjunction with training subsystem 207 to generate and associate speech metrics with inmates of the controlled environment. Training subsystem 207 monitors voice and translated voice data (e.g., stored in database 208) and generates speech metrics associated with the parties associated with the voice and translated voice data. Monitoring includes audio analysis of voice data to determine, as discussed above, characteristics of each speaker's voice— for example, cadence, word frequency, and intonation. Training subsystem 207 generates speech metrics based on the monitored characteristics and utilizes the speech metrics to improve the efficiency and accuracy of translation subsystem 204. In some embodiments, training subsystem 207 generates a speech profile for each user in call translation system 100 based on the speech metrics. For example, a speech profile can indicate how quickly an inmate speaks, frequency of words spoken including most spoken words and phrases, as well as the person's intonation or specific accent. Training subsystem then utilizes the speech metrics or speech profile to train translation subsystem 204 with respect to the user associated with the speech metrics.

Speech metrics can be utilized by translation subsystem 204 during a call to improve the translation of a user's voice data. In some embodiments, translation subsystem 204 may use the frequency of words or phrase spoken metric to anticipate words to be translated or use previously stored translations to speed up the translation process. For example, an inmate's speech profile can indicate that the inmate often says a certain phrase comprising five words. When translation subsystem 204 detects the first three words, translation subsystem 204 can retrieve a stored translation for the certain phrase rather than performing the actual translation. In other embodiments, translation subsystem 204 will anticipate the next two words of the phrase and begin the translation process prior to the user completing the phrase.

In some embodiments, the functionality of any of translation subsystem 204, authentication subsystem 205, profile subsystem 206, or training subsystem 207 can be implemented in monitoring system 140.

Database 208 includes any number of databases and/or servers, and stores and organizes data in a relational database. Database 208 runs a database management system, such as MYSQL', to provide an example. Database 208 stores inmate-specific information regarding the content associated with each inmate and subject to administrative rules associated with the inmate, the calling device to which the inmate has signed in, and/or the specific content. Database 208 further stores administrative rules that are utilized by call translation server 200 and monitoring system 104 to monitor and manage call sessions within the controlled environment. Administrative rules can be apply to inmates as an inmate specific rule or a global rule, to devices as a device specific rule, a device type rule, or a global rule, and to content as a content specific rule, a content type rule, and a global rule. Administrative inmate rules can be associated with an inmate (or inmates) and either allow or restrict access to call session functionality based on the identity of the inmate. Examples of administrative inmate rules include but are not limited to restricting or limiting the inmate's access to call session functionality, restricting or limiting contacts that can be added to the inmate's PAN list, and restricting or limiting the inmate's ability to change or add language identifiers to the inmate's profile.

Database 208 further stores all call sessions including the voice data and translated voice data as well as user profiles. The stored call sessions may be later analyzed or provided to a monitoring system, such as monitoring system 140, for later analysis. Database 208 also includes biometric and authentication information of all inmates within the controlled environment. Moreover, database 208 can also include biometric information of any outside party approved to participate in the call session functionality within the controlled environment.

Exemplary Calling Device

Figure 3:
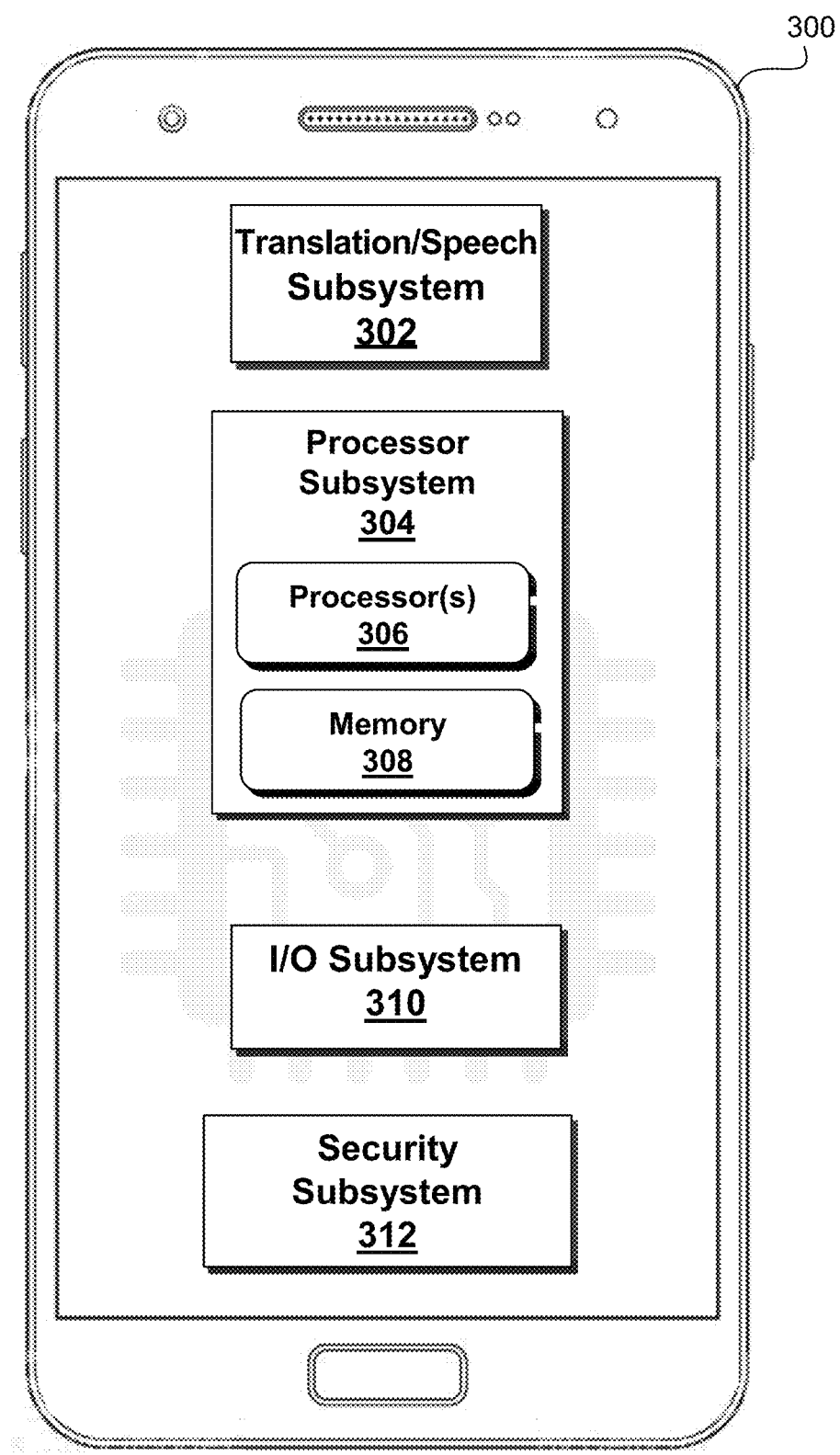
FIG. 3 illustrates a block diagram of an exemplary calling device for use in the exemplary call translation system of FIG. 1, according to embodiments of the present disclosure.

FIG. 3 illustrates a block diagram of an exemplary calling device 300 for use in the exemplary call translation system 100 of FIG. 1, according to some embodiments of the present disclosure. Calling device 300 represents an exemplary embodiment of calling device 110 such as smartphone 110a, tablet 110b, wearable device 110c, and call kiosk 110d, and/or outside calling device 130, as described in FIG. 1. In some embodiments, calling device 300 includes translation/speech subsystem 302, processor subsystem 304, input/output subsystem 310, and security subsystem 312.

In some embodiments, translation/speech subsystem 302 controls call translation functionality and speech processing for calling device 300. In some embodiments, when call translation functionality is centralized at call translation server 200, translation/speech subsystem 302 does not perform call translation functionality and only performs speech processing of voice data prior to transmission to call translation server 200. In some embodiments, when call translation functionality is distributed between call translation server 200 and calling device 300, translation/speech subsystem 302 performs call translation functionality and speech processing prior to transmission to call translation server 200.

Translation/speech subsystem 302 executes a call translation application that is installed on calling device 300, for example, in memory 308. In some embodiments, the call translation application is required in order for calling device 300 to participate in a calling session within call translation system 100. In executing the call translation application, translation/speech subsystem provides a GUI that allows a user of calling device 300 to initiate or receive a calling session through call translation server 200 as well as initiate translation of any speech.

In some embodiments, translation/speech subsystem 302 coordinates call translation functions with call translation server 200. Translation/speech subsystem 302 receives speech from a user of calling device 300 through a communication interface, such as input/output subsystem 310, and generates voice data based on the received speech. In some embodiments, such as when call translation functions are centralized, translation/speech subsystem 302 merely transmits the generated voice data to call translation server 200 for translation. In some embodiments, such as when call translation functions are distributed between calling device 300 and call translation server 200, translation/speech subsystem 302 pre-processes voice data received from a user of calling device 300 to increase the efficiency of any call translation performed by call translation server 200. For example, translation/speech subsystem 302 may remove background noise from voice data, parse voice data into segments (e.g., words, phrases, sentences), and identify words and/or phrases commonly used by a user of calling device 300. The pre-processed voice data (e.g., voice data with background noise removed, segmented voice data, or identified words and phrases) is then transmitted to call translation server 200 through a communication interface of calling device 300, such as input/output subsystem 310.

In some embodiments, calling device 300 does not automatically have call translation functionality implemented for use by the inmate. For example, the controlled environment can, by default, disable all call translation functionality of calling device 300 and can require inmates to submit requests to add the call translation functionality to their devices. In some embodiments, call translation server 200 receives a request from calling device 300 to enable call translation functionality. In some embodiments, the request includes an identifier associated with the inmate and/or calling device 300 to allow call translation server 200 to process the request. Enabling call translation functionality includes, for example, install a call translation application on calling device 300. Call translation server 200 will either approve or reject the request based on a determination that the user associated with calling device 300 is authorized to utilize call translation functionality. For example, the profile associated with the user, such as an user profile, will indicate whether the user has been approved or otherwise granted permission to have call translation functionality installed on their respective calling devices.

Processor subsystem 304 includes one or more processors 306 and memory 308. The number of processors 306 can be scaled to match the number of simultaneous user connections desired to be supported by an call translation system such as call translation system 100 of FIG. 1. Processors 306 control the operation of calling device 300 and its components. In some embodiments, memory 308 can be any well-known volatile and/or non-volatile memory that is removable and/or non-removable. Memory 308 can store inmate preferences, user profiles including PAN lists and speech profiles associated with the inmate currently using calling device 300, and voice and translated voice data.

In some embodiments, input/output subsystem 310 includes one or more transceivers, transmitters, and/or receivers that communicate via a wireless interface, such as through one or more antennas. For example, input/output subsystem 310 includes a component, such as a Bluetooth transceiver, that enables Bluetooth communication between calling device 300 and an external device that also has Bluetooth capability, such as an access point or another calling device 300 such as a smartphone, a tablet, or wireless accessories such as a wireless headset. In an embodiment, input/output subsystem 310 is configured to transmit and receive communications between calling device 300 and call translation server 200 via network 101. In an embodiment, input/output subsystem 310 connects calling device 300 with other devices such as a mobile device, a kiosk, an access point, a beacon, and/or external input devices such as a keyboard, mouse, camera, or touch interface.

In some embodiments, security subsystem 312 coordinates security of calling device 300 by authenticating users and by communicating authentication information with call translation server 120. Security subsystem 312 can authenticate users of calling device 300 utilizing identity data of inmates. Identity data includes but is not limited to at least one of a username and password data, challenge questions, challenge answers, biometric data, device data such as make and model of a communication device, and/or location data. Biometric data includes one or more of a finger print, a hand print, a voice sample, an iris or retinal sample, an image of the user (2D or 3D), a hand geometry, a signature identification, an infrared camera identification, or any other biometric as deemed appropriate. The challenge question form of identity data may be a series of challenge questions, or a single challenge question such as the last four digits of an inmate's social security number, mother's maiden name, and the like. Authentication subsystem 216 is further configured to facilitate a secure communication between parties receiving/transmitting a communication by performing identity verifications to authenticate identities of purported parties. The identity verification includes logon verifications, such as username and password verifications, biometric verification, response to challenge questions, device verification, and/or location verification.

Security subsystem 312 also can control and manage connections between calling device 300 and call translation server 200. For example, security subsystem 312 establishes secure connections between calling device 300 and call translation server 200.

Exemplary Call Translation System Operation

Exemplary usage of call translation system 100, call translation server 200, and calling device 300 in a controlled environment will be described with respect to FIGS. 4-7. The exemplary usage described in FIGS. 4-7 can be performed by processing logic that can comprise hardware (e.g., circuitry, dedicated logic, programmable logic, microcode, etc.), software (e.g., instructions executing on a processing device), or a combination thereof. For illustrative purposes, FIGS. 4-7 are described with respect to FIGS. 1-3 but are not limited to these example embodiments.

Figure 4:
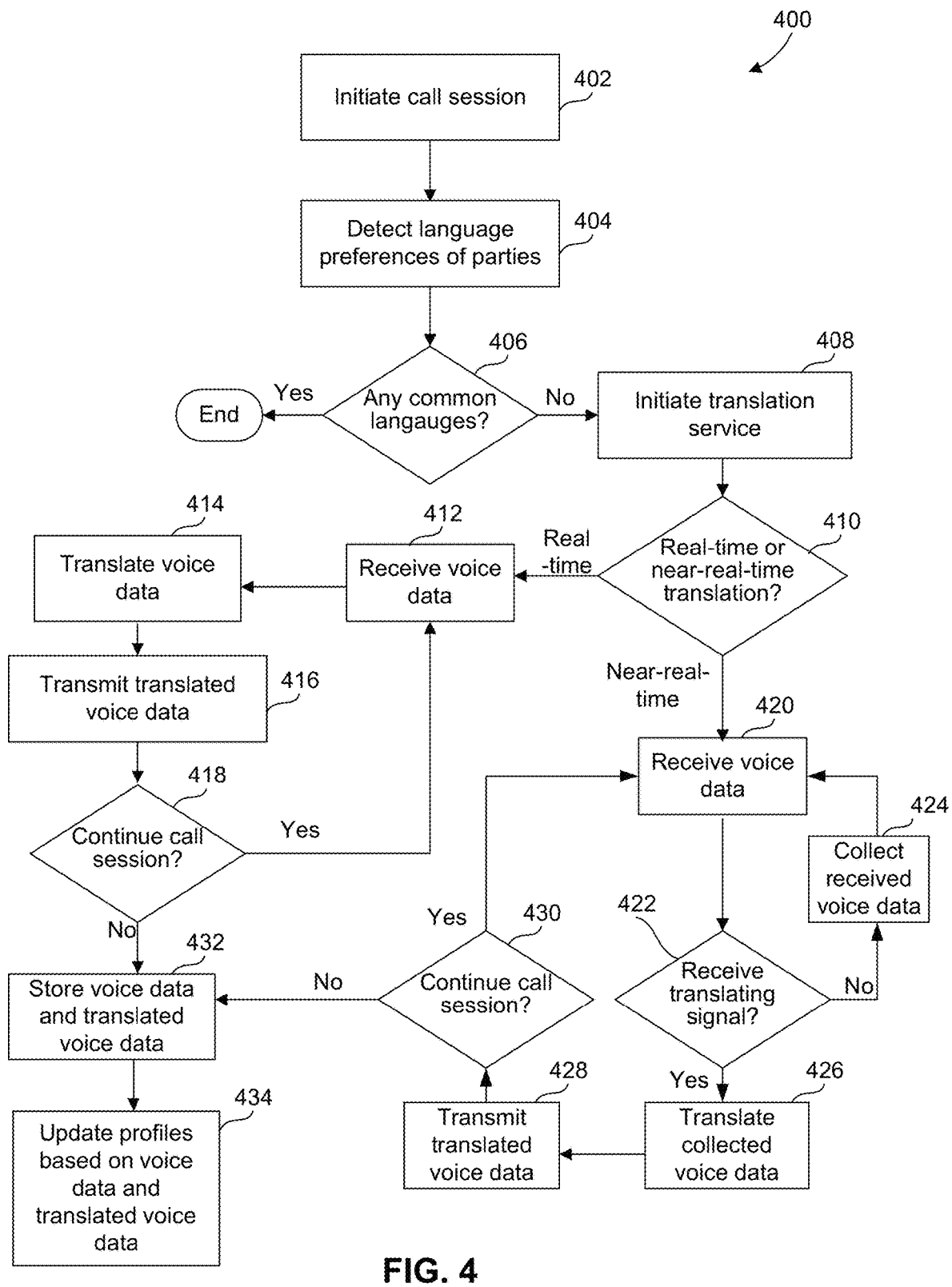
FIG. 4 illustrates a flowchart diagram of an exemplary method for language translation of a real-time communication in the exemplary call translation system of FIG. 1, according to embodiments of the present disclosure.

FIG. 4 illustrates a flowchart diagram of an exemplary method for language translation of a real-time communication in the exemplary call translation system of FIG. 1, according to embodiments of the present disclosure. Method 400 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 4, as will be understood by a person of ordinary skill in the art. Some steps can be combined with steps of methods from other figures and performed as a single step. Method 400 can be performed by call translation server 200.

In 402, call translation server 200 initiates a call session. The call session may be initiated in response to a call request from calling device 300. In some embodiments, the call session is between calling device 110 within a controlled environment and outside calling device 130 and the call request may be transmitted by either calling device 110 or outside calling device 130.

In 404, call translation server 200 detects the language preferences of parties associated with the call session. In some embodiments, the language preferences of the parties including the called and calling parties are stored in a profile associated with the resident of the controlled environment (e.g., the inmate). For example, the user profile includes a PAN list that identifies all contacts with whom the inmate may initiate a calling session. In addition to storing identifying information (e.g., name, telephone number) of the contacts, the PAN list also stores language identifiers associated with each contact. Language identifiers identify the languages (e.g., English, Spanish, French, etc.) spoken by the contact. In some embodiments, each user that has participated in a calling session through call translation system 100 has their own profile and the language preferences of the parties are included in the respective profiles for each user. Accordingly, in some embodiments, call translation server 200 determines the languages spoken by the parties by detecting the language identifiers associated with each party.

In some embodiments, profiles also include language identifiers of preferred target languages into which voice data should be translated when translation services takes place (e.g., when there are not language in common between the profiles). For example, a user's profile can indicate a preferred target language of Spanish. When the user is involved in a call with another user where there are no common languages (e.g., as indicated by a lack of shared language identifiers in their respective profiles), call translation server 200 will translate any voice data into Spanish before transmitting it to the calling device associated with the user.

In 406, call translation server 200 determines whether any of the detected languages match. In some embodiments, call translation server 200 compares the language identifiers associated with each user to determine whether any match. At least one match between language identifiers indicates that the users speak a common language and that language translation services is likely not necessary. Each user may be associated with one or more language identifiers (indicating that the user speaks one or more languages). Accordingly, there may be more than one common language spoken by each user.

In 408, if call translation server 200 determines that the users do not speak a common language (e.g., there are no matching language identifiers), call translation server 200 initiates a translation service associated with the call translation functions described in the present disclosure. The translation service includes speech recognition functionality and language translation functionality. Speech recognition allows the translation service to identify segments (e.g., words, phrases, sentences, etc.) within voice data and recognize the content within the segments. Language translation functionality, in conjunction with the speech recognition, allows the translation service to translate the segments from one language to another language. In some embodiments, initiating the translation service initiates the translation service at the call translation server 200. In other embodiments, initiating the translation service initiates the translation application on calling device 300 and call translation server 200.

In 410, call translation server 200 determines whether to perform real-time or near-real time translation of voice data received during the call session. In some embodiments, this determination is based on preferences established by administrators of the controlled environment. For example, administrators may establish a global rule that all call sessions within the controlled environment should undergo real-time or near-real-time translation. As another example, administrators may establish user-specific rules associated with specific users of the controlled environment or call session. The user-specific rules indicate whether to perform real-time or near-real-time translation of voice data in call sessions involving the specific users. In some embodiments, administrators may modify profiles to include the user-specific rules. Administrators also will restrict access to portions of the user profiles that cannot be altered by users of the controlled environment such as the user-specific rules. In other words, in some embodiments, user profiles contain information that can be modified or updated by users and information to which the users cannot update or access. Administrators ultimately have final control over all information contained in a user profile and grant certain privileges to the users to portions of the profile. Also, although not shown in 410, call translation server 200 also can determine whether to perform delayed translation.

In 412, call translation server 200 determines that real-time voice translation is to be performed during the call session. Call translation server 200 receives the voice data during the call session and in 414 and 416 immediately begins translating the voice data and transmitting the translated voice data, respectively. In 418, call translation server 200 determines whether the call session has completed or is still continuing. For example, one or more of the users could have ended the call by hanging up. If still continuing, call translation server 200 repeats 412-418 until the call ends. In one embodiment, call translation server 200 utilizes a call translation system such as a neural network for implementing the call translation functions. A neural network is a type of machine learning model that is trained over a period of time to "learn" how sequences of words should be translated from one language to another. This training requires the neural network to examine a large amount of stored data sets associated with each language. For example, the data sets are sentences in each language and the neural network determines patterns for how sentences are structured in each language. The neural network then associates a certain input (e.g., a sequence of words in a first language as represented by a certain waveform) with a certain output (e.g., another sequence of words in a target language as represented by another waveform) based the learned structures associated with each language. In some embodiments, the call translation system segments original voice data, based on the machine learning, generates a number of possible translated voiced data for each segment of the original voice data. The call translation system, relying on learning how sentences are structured in each language, generates translated voice data for the entire sentence by combining the translated segments in a sequence that is most likely for the target language.

In some embodiments, the call translation system may be located external to call translation server 200, implemented within call translation server 200, and/or operated by a third party that is separate from the controlled facility.

In 420, call translation server 200 determines that near-real-time voice translation is to be performed during the call session. In 422, call translation server 200 determines whether it has received a translating signal. In some embodiments, the translating signal is provided by calling device 300 such as through a particular touch-tone signal (e.g., from a POTS phone) or through the pressing of a specific button provided through a GUI on a smartphone (e.g., a "translate now" software button displayed on the call translating application). In some embodiments, the translating signal is generated by a component internal to call translation server 200 such as translation subsystem 204. For example, translation subsystem 204 generates the translating signal upon detection of silence (e.g., lack of voice data) over a predetermined period of time during the call session.

In 424, if call translation server 200 does not receive a translating signal, call translation server 200 collects the received voice data and continues to receive additional voice data, in 420, until call translation server 200 receives the translating signal. In 426, call translation server 200 has received the translating signal and utilizes the translation service (e.g., as executed by translation subsystem 204) to translated the collected voice data. In 428, call translation server 200 transmits the translated voice data over the call session. In 430, call translation server 200 determines whether the call session has completed or is still continuing. If still continuing, call translation server 200 repeats 420-430 until the call session ends.

In 432, when call session has ended, call translation server 200 stores both the voice data and the translated voice data that was received during the call session. For example, call translation server 200 stores all data in a database such as database 208. In 434, call translation server 200 updates the profiles of users that participated in the call session. In some embodiments, updating the profiles includes associating the stored voice and translated voice data with the profiles of the users. In some embodiments, updating the profiles includes generating speech metrics based on the stored voice and translated voice data and updating a speech profile to include the generated speech metrics.

Figure 5:
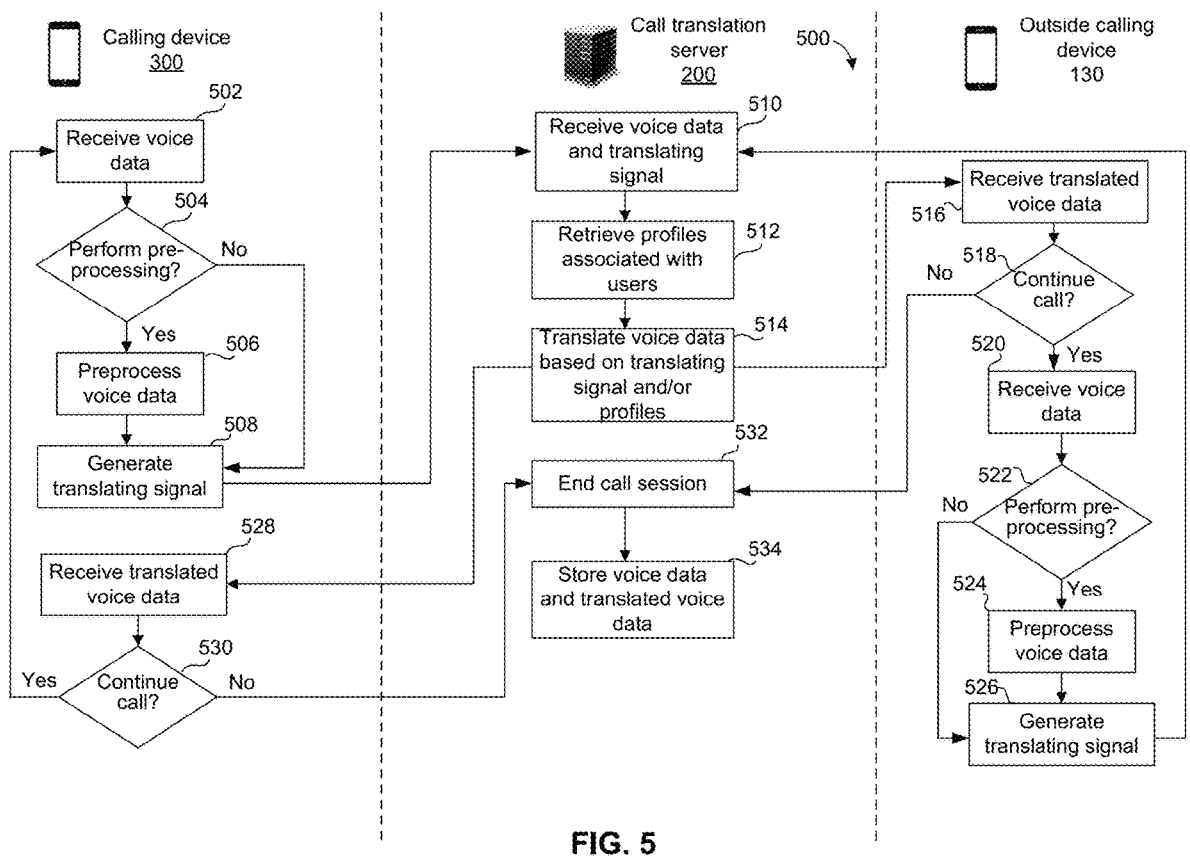
FIG. 5 illustrates a flowchart diagram of an exemplary method for language translation of a real-time communication in the exemplary call translation system of FIG. 1, according to embodiments of the present disclosure.

FIG. 5 illustrates a flowchart diagram of an exemplary method for language translation of a real-time communication in the exemplary call translation system of FIG. 1, according to embodiments of the present disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 5, as will be understood by a person of ordinary skill in the art. Some steps can be combined with steps of methods from other figures and performed as a single step. Method 500 can be performed by calling device 300, call translation server 200, and outside calling device 130. Method 500 involves an established call session between the two calling devices.

In 502, during an established call session, calling device 300 receives voice data. Voice data is generated when a user of calling device 300 starts speaking during the call session. In 504, calling device 300 determines whether to perform any pre-processing of the voice data. In some embodiments, this determination is based on whether the call translation functionality of the call translation system 100 is distributed between calling devices and call translation server 200 or if it is centralized at call translation server 200.

In 506, calling device 300 performs pre-processing of voice data, which as discussed above, includes but is not limited to eliminating background noise from the voice data and performing initial translation of certain words or phrases within the voice data. In 508, calling device 300 transmits the voice data and generates a translating signal that notifies call translation server 200 to perform the translation of the voice data. In other embodiments, calling device 300 only transmits the voice data and call translation server 200 generates a translation signal based on monitoring the call session.

In 510, call translation server 200 receives the voice data and translating signal (if transmitted) from calling device 300. In 512, call translation server 200 retrieves a profile associated with the users of calling devices involved in the call session. Retrieving the profile allows call translation server 200 to determine whether translation services is necessary and the languages in common between the users. If a profile includes more than one language identifier, profiles may also prioritize languages to indicate which languages are more preferred. For example, an inmate may rank English as a first language and French as a second language. In some embodiments, call translation server may forego retrieving the profile if the translating signal received from calling device 300 includes the necessary information. For example, calling device 300 may generate a translating signal that indicates that the translation of voice data should take place and the language into which the voice data should be translated.

In some embodiments, call translation server 200 also retrieves speech profiles associated with each user of the call. Speech profiles include speech metrics that have been generated based on voice and translated voice data from a history of a user's previous call sessions. Speech profiles enable call translation server 200 to more quickly and efficiently translate speech for a particular user based on the learned speech patterns of the user's voice.

In 514, call translation server 200 translates the received voice data based on the translating signal and/or associated profiles. Translating the received voice data includes identifying the current language of the received voice data, identifying the target language into which the received voice data should be translated, and then performing the actual translation of the received voice data from the current language to the target language. In some embodiments, call translation server 200 detects, in real-time, the current language of the received voice data by analyzing a predetermined amount of the received voice data. In other embodiments, calling device 300 must provide an indication, such as in a call request, the language in which the users will speak during the voice call. In such embodiments, call translation server 200 periodically checks received voice data to ensure that the users are speaking the language as indicated in the call request. In some embodiments, the target language is determined from the inmate profile, as described above. In other embodiments, the target language is determined from the translating signal received from the calling device.

After translating the voice data, call translation server 200 transmits the translated voice data to calling device 130. In some embodiments, call translation server 200 transmits the translated voice data to both calling device 300 and calling device 130 so that the user of calling device 300 can verify the accuracy of the translation. In some embodiments, the call translating application in calling device 300 provides an option for the user of calling device 300 to confirm the accuracy of the translation or notify appropriate personnel within call translation system 100 that there has been an error in the translation.

In 516, outside calling device 130 receives the translated voice data from call translation server 200. Outside calling device 130 then can play the translated voice data for the user of outside calling device 130. In 518, outside calling device 130 then determines whether the call session is continuing (e.g., if one of the users of either calling device 300 or outside calling device 130 has ended the call session).

In 520, if the call session continues, outside calling device 130 receives voice data from a user of outside calling device 130. In 522, outside calling device 130 determines whether to perform any pre-processing of the voice data. In some embodiments, this determination is based on whether the call translation functionality of the call translation system 100 is distributed between calling devices and call translation server 200 or if it is centralized at call translation server 200.

In 524, outside calling device 130 performs pre-processing of voice data, which as discussed above, includes but is not limited to eliminating background noise from the voice data and performing initial translation of certain words or phrases within the voice data. In 526, outside calling device 130 transmits the voice data and generates a translating signal that notifies call translation server 200 to perform the translation of the voice data. In other embodiments, outside calling device 130 only transmits the voice data and call translation server 200 generates a translation signal based on monitoring the call session.

Call translation server 200 receives the voice data and the translating signal (if transmitted) from outside calling device 130 and performs 510-514 with regard to the voice data received from outside calling device 130. Call translation server 200 transmits the translated voice data to calling device 300. In 528, calling device 300 receives the translated voice data and plays the translated voice data for the user of calling device 300. In 530, calling device 300 then determines whether the call session is continuing (e.g., if one of the users of either calling device 300 or outside calling device 130 has ended the call session).

In 532, call translation server 200 receives an indication that the call session is ended and takes appropriate steps to terminate the call session. In 534, call translation server 200 then stores both the voice data and the translated voice data that was received during the call session. For example, call translation server 200 stores all data in a database such as database 208. In some embodiments, call translation server 200 further updates the profiles of users that participated in the call session. In some embodiments, updating the profiles includes associating the stored voice and translated voice data with the profiles of the users. In some embodiments, updating the profiles includes generating speech metrics based on the stored voice and translated voice data and updating a speech profile to include the generated speech metrics.

Figure 6:
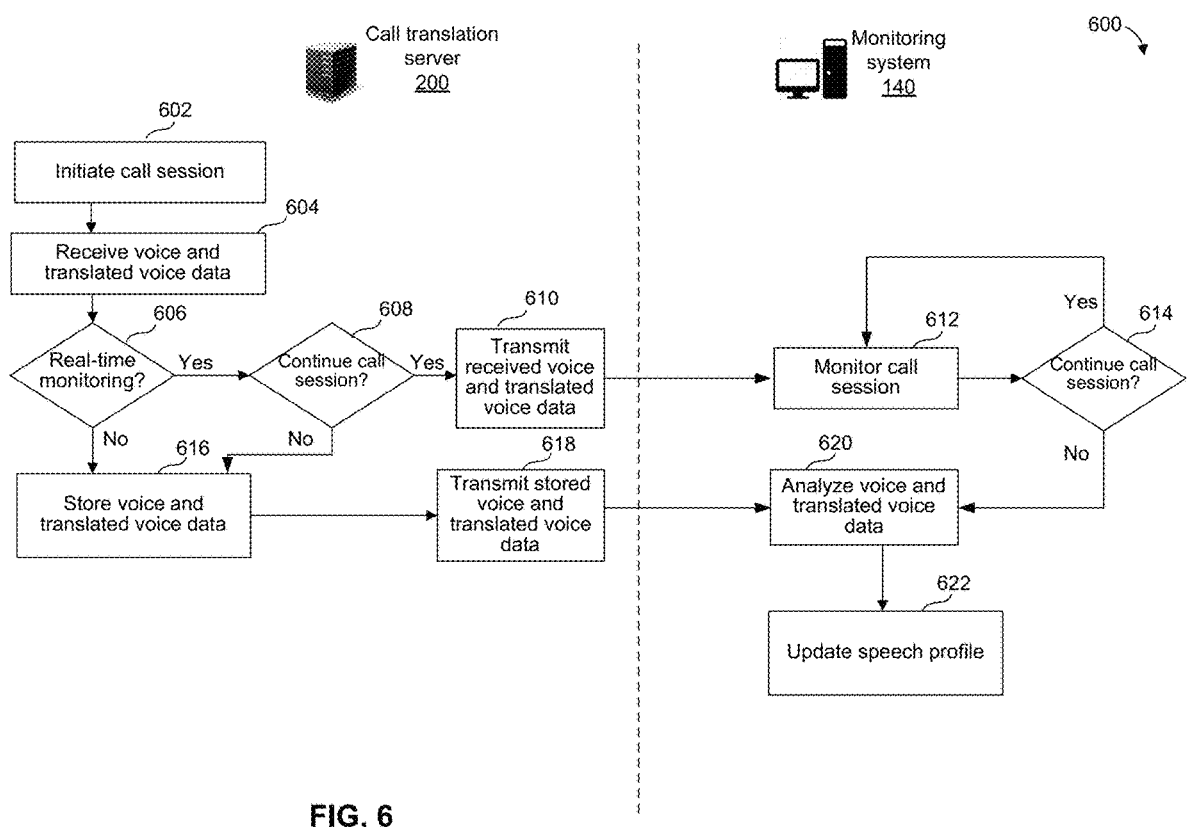
FIG. 6 illustrates a flowchart diagram of an exemplary method for monitoring and analyzing voice and translated voice data in a call session in the exemplary call translation system of FIG. 1, according to embodiments of the present disclosure.
Figure 7:
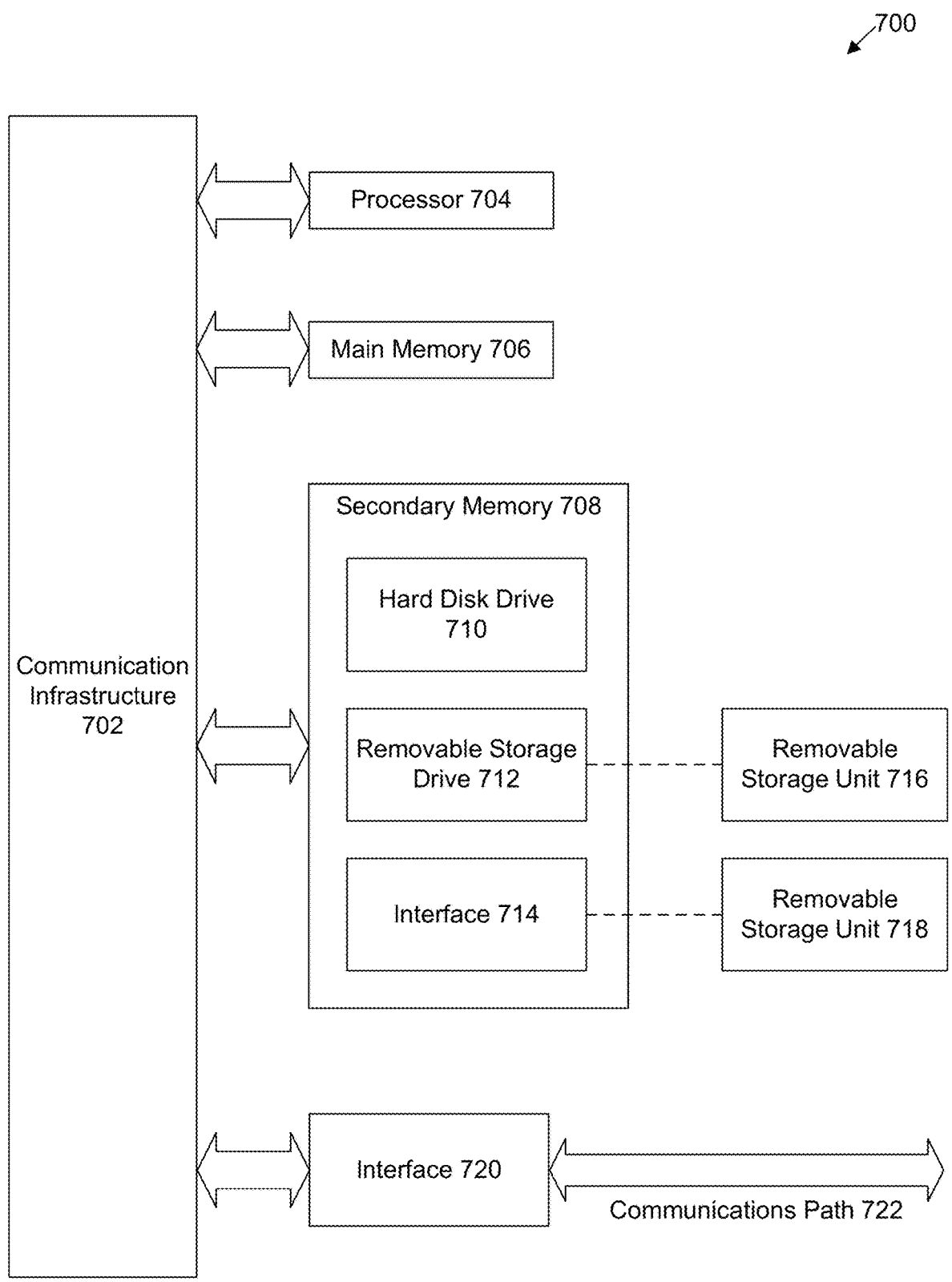
FIG. 7 illustrates a block diagram of a general purpose computer that may be used to perform various aspects of the present disclosure.

FIG. 6 illustrates a flowchart diagram of an exemplary method for monitoring and analyzing voice and translated voice data in a call session in the exemplary call translation system of FIG. 1, according to embodiments of the present disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 6, as will be understood by a person of ordinary skill in the art. Some steps can be combined with steps of methods from other figures and performed as a single step. Method 600 can be performed by call translation server 200 and monitoring system 140.

In 602, call translation server 200 initiates a call session between calling devices including one calling device within a controlled environment (e.g., a calling device operated by an inmate of the controlled environment). In 604, call translation server 200 receives voice and translated voice data that is transmitted during the call session between the calling devices.

In 606, call translation server 200 determines whether to perform real-time monitoring of the call session. Real-time monitoring of the call session by monitoring system 140 means that the monitoring system 140 monitors the call session while the call session is established. In 608, call translation server 200 determines whether the call session is continuing (e.g., whether a user of calling device has ended the call session). If yes, then in 610, when real-time monitoring is activated, call translation server 200 transmits the received voice and translated voice data to monitoring system 140. In some embodiments, monitoring system 140 is incorporated within call translation server 200. In other embodiments, monitoring system 140 is separate from call translation server 200.

In 612, monitoring system 140 receives the transmitted voice and translated voice data and monitors the call according to any rules or restrictions established by the call translation server 200 with respect to call sessions. Monitoring the call session includes manually listening into the call session by an authorized personnel of call translation system 100 or automated listening of the call session whereby voice data is monitored according to any rules or restrictions implemented by the controlled environment with respect to call sessions. In 614, monitoring system 140 determines whether the call session is continuing. If yes, monitoring system 140 continues to monitor the call session through the received voice and translated voice data from call translation server 200.

In 616, call translation server 200 determines that real-time monitoring is not activated or that the call session has ended and stores the voice and translated voice data that was received and generated during the call session. In some embodiments, call translation server 200 stores the voice and translated voice data in profiles associated with the users that participated in the call session. In 618, call translation server 200 transmits the stored voice and translated voice data to monitoring system 140.

In 620, monitoring system 140 analyzes the received voice and translated voice data. In some embodiments, analysis of the voice and translated voice data includes generating speech metrics, as discussed above, with respect to the voice and translated voice data. Generating speech metrics includes determining various characteristics of each user with respect to the voice and translated voice data. For example, speech metrics includes but is not limited to cadence, word/phrase frequency, and intonation of the user's speech. In 622, monitoring system 140 either generates a speech profile (if one does not already exist) or updates an existing speech profile for a user based on the generated speech metrics. Determining the speech metrics of each user based on a history of the user's voice and translated voice data enables the call translation server 200 to learn and improve call translation for each user. As discussed above, call translation server 200 utilizes speech profiles to improve the accuracy and speed at which call translation server 200 translate voice data for the particular user. As an example, call translation server 200 may adjust the predetermined period of time for which it detects silence (e.g., lack of voice data) based on learning a user's cadence over a history of the user's call sessions.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4-7 can be implemented in the environment of one or more computer systems or other processing systems. An example of such a computer system 800 is shown in FIG. 8. One or more of the modules depicted in the previous figures can be at least partially implemented on one or more distinct computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method for bidirectional language translation within a controlled environment, comprising:

receiving a call request for establishing a call session between a first device associated with a first user within the controlled environment and a second device associated with a second user, the call request comprising a contact identifier associated with the second user;

retrieving a global rule associated with the controlled environment and a user profile associated with the first user, the user profile comprising a user-specific rule associated with the first user and a personal allowed number (PAN) list wherein the PAN list comprises the contact identifier associated with the second user, wherein the global rule is applied globally to call sessions in the controlled environment;

establishing the call session between the first device and the second device based on the user profile;

joining a third device to the call session, wherein the third device is associated with an administrative profile of a third user;

determining whether to apply real-time translation or near-real-time translation to the call session based on the global rule and the user-specific rule; and based on the determining:

generating translated voice data by translating voice data received during the call session based on a third language identifier associated with the administrative third user and at least one of a first language identifier associated with the first user or a second language identifier associated with the second user.

2. The method of claim 1, further comprising:
retrieving a first language identifier associated with the first user, or a second language identifier associated with the second user from the user profile;
prior to generating the translated voice data, determining whether the first language identifier matches the second language identifier, wherein the generating the translated voice data is in response to determining that the first language identifier does not match the second language identifier.

3. The method of claim 1, wherein the user profile further comprises speech metrics and the speech metrics are generated based on a previous call session associated with the first user.

4. The method of claim 1, wherein user-specific rule specifies actions that may be performed by the first user including at least one of access to call session functionality, adding a contact to the PAN list, and changing a first language identifier associated with the first user.

5. The method of claim 1, further comprising:
prior to generating the translated voice data, receiving a translating signal indicating that the voice data is to be translated;
initiating a translation application based on the translating signal; and
generating, by the translation application, the translated voice data.

6. The method of claim 5, wherein the translating signal is generated based on at least one of a physical button press from the first device or the second device, an icon button press from the first device or the second device, or detecting that the voice data has not been received within a predetermined period of time during the call session.

7. The method of claim 1, wherein in response to determining to apply real-time translation, the generating the translated voice data comprises immediately performing the translating when the voice data is received.

8. The method of claim 1, wherein in response to determining to apply near-real-time translation, the generating the translated voice data comprises receiving a translating signal from the first device wherein the translating signal is provided when a physical button is pressed on the first device.

9. A call translation server within a controlled environment, comprising:
a memory; and
a processor coupled to the memory, the processor configured to:
receive a call request for establishing a call session between a first device associated with a first user within the controlled environment and a second device associated with a second user, the call request comprising a contact identifier associated with the second user;
retrieve a global rule associated with the controlled environment and a user profile associated with the first user, the user profile comprising a user-specific rule associated with the first user and a personal allowed number (PAN) list wherein the PAN list comprises the contact identifier associated with the second user, wherein the global rule is applied globally to call sessions in the controlled environment and the speech metrics is generated based on a previous call session associated with the first user;
establish the call session between the first device and the second device based on the user profile;
join a third device to the call session, wherein the third device is associated with an administrative profile of a third user;
determine whether to apply real-time translation or near-real-time translation to the call session based on the global rule and the user-specific rule; and
based on the determining:
generate translated voice data by translating voice data received during the call session based on a third language identifier associated with the administrative third user and at least one of a first language identifier associated with the first user or a second language identifier associated with the second user.

10. The call translation server of claim 9, the processor further configured to:
retrieve a first language identifier associated with the first user, or a second language identifier associated with the second user from the user profile;
prior to generating the translating voice data, determine whether the first language identifier matches the second language identifier, wherein the generating the translated voice data is in response to determining that the first language identifier does not match the second language identifier.

11. The call translation server of claim 9, wherein the user profile further comprises speech metrics and the speech metrics are generated based on a previous call session associated with the first user.

12. The call translation server of claim 9, wherein user-specific rule specifies actions that may be performed by the first user including at least one of access to call session functionality, adding a contact to the PAN list, and changing a first language identifier associated with the first user.

13. The call translation server of claim 9, the processor configured to:
prior to generating the translated voice data, receive a translating signal indicating that the voice data is to be translated;
initiate a translation application based on the translating signal; and
generate, by the translation application, the translated voice data.

14. The call translation server of claim 13, wherein the translating signal is generated based on at least one of a physical button press from the first device or the second device, an icon button press from the first device or the second device, or detecting that the voice data has not been received within a predetermined period of time during the call session.

15. The call translation server of claim 9, wherein in response to determining to apply near-real-time translation, the generating the translated voice data comprises receiving a translating signal from the first device wherein the translating signal is provided when a physical button is pressed on the first device.

16. A non-transitory computer-readable medium having instructions stored therein, which when executed by a processor in a tethered mobile device, cause the processor to perform operations, the operations comprising:
receiving a call request for establishing a call session between a first device associated with a first user within the controlled environment and a second device associated with a second user, the call request comprising a contact identifier associated with the second user;

retrieving a global rule associated with the controlled environment and a user profile associated with the first user, the user profile comprising a user-specific rule associated with the first user and a personal allowed number (PAN) list wherein the PAN list comprises the contact identifier associated with the second user, wherein the global rule is applied globally to call sessions in the controlled environment and the speech metrics is generated based on a previous call session associated with the first user;

establishing the call session between the first device and the second device based on the user profile;

joining a third device to the call session, wherein the third device is associated with an administrative profile of a third user; and determining whether to apply real-time translation or near-real-time translation to the call session based on the global rule and the user-specific rule; and based on the determining:

generating translated voice data by translating voice data received during the call session based on a third language identifier associated with the administrative third user and at least one of a first language identifier associated with the first user or a second language identifier associated with the second user.

17. The non-transitory computer-readable medium of claim 16, the operations further comprising:

retrieving a first language identifier associated with the first user, or a second language identifier associated with the second user from the user profile;

prior to generating the translating voice data, determining whether the first language identifier matches the second language identifier, wherein the generating the translated voice data is in response to determining that the first language identifier does not match the second language identifier.

18. The non-transitory computer-readable medium of claim 16, wherein the user profile further comprises speech metrics and the speech metrics are generated based on a previous call session associated with the first user.

19. The non-transitory computer-readable medium of claim 16, wherein user-specific rule specifies actions that may be performed by the first user including at least one of access to call session functionality, adding a contact to the PAN list, and changing a first language identifier associated with the first user.

20. The non-transitory computer-readable medium of claim 16, wherein in response to determining to apply near-real-time translation, the generating the translated voice data comprises receiving a translating signal from the first device wherein the translating signal is provided when a physical button is pressed on the first device.

* * * * *